(12) United States Patent
Chen et al.

(10) Patent No.: US 12,517,956 B2
(45) Date of Patent: Jan. 6, 2026

(54) METHOD, ELECTRONIC DEVICE, AND COMPUTER PROGRAM PRODUCT FOR DATA PROCESSING

(71) Applicant: Dell Products L.P., Round Rock, TX (US)

(72) Inventors: Si Chen, Shanghai (CN); Zhenzhen Lin, Shanghai (CN); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 17/854,383

(22) Filed: Jun. 30, 2022

(65) Prior Publication Data
US 2023/0401264 A1    Dec. 14, 2023

(30) Foreign Application Priority Data
Jun. 10, 2022    (CN) .......................... 202210658237.3

(51) Int. Cl.
   *G06F 16/907*    (2019.01)
   *G06V 20/40*    (2022.01)
   *H04W 4/44*    (2018.01)

(52) U.S. Cl.
   CPC ............ *G06F 16/907* (2019.01); *G06V 20/46* (2022.01); *H04W 4/44* (2018.02); *G06V 2201/07* (2022.01)

(58) Field of Classification Search
   CPC .... G06F 16/908; G06F 16/909; G06F 16/907; G06F 16/902; H04W 4/44; G06V 10/7715; G06V 20/46; G06V 2201/07
   See application file for complete search history.

(56) References Cited

U.S. PATENT DOCUMENTS

| | | | |
|---|---|---|---|
| 11,171,850 B2 * | 11/2021 | Yi | H04L 43/0888 |
| 2005/0289182 A1 * | 12/2005 | Pandian | G06Q 10/10 |
| 2009/0024619 A1 * | 1/2009 | Dallmeier | G06F 16/7837 707/999.005 |

(Continued)

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

(Continued)

*Primary Examiner* — Amy Ng
*Assistant Examiner* — Dustin D Eyers
(74) *Attorney, Agent, or Firm* — Ryan, Mason & Lewis, LLP (57) ABSTRACT

Embodiments of the present disclosure provide a method, an electronic device, and a computer program product for data processing. The method may include receiving a data conversion strategy from a server. The method may further include determining, in response to receiving unstructured data from a field device, metadata of the unstructured data based on the received data conversion strategy to form a set of metadata. In addition, the method may include transmitting at least a part of the set of metadata to the server. According to embodiments of the present disclosure, edge computing can be performed on unstructured data, which not only enables timely processing of monitoring data, but also reduces computing load on the side of the server, thereby improving the user experience.

20 Claims, 6 Drawing Sheets

(56) References Cited

U.S. PATENT DOCUMENTS

| | | | | |
|---|---|---|---|---|
| 2010/0070538 A1* | 3/2010 | Spinelli | .................. | G06F 16/22 |
| | | | | 707/802 |
| 2011/0167081 A1* | 7/2011 | Kosaka | ................ | G06V 30/413 |
| | | | | 707/769 |
| 2015/0339359 A1* | 11/2015 | Takaoka | ................ | G06F 16/254 |
| | | | | 707/602 |
| 2016/0306871 A1* | 10/2016 | Chauhan | ............. | G06F 16/2477 |
| 2017/0195238 A1* | 7/2017 | Luo | .................... | H04L 47/2441 |
| 2017/0277700 A1* | 9/2017 | Davis | .................... | G11B 27/28 |
| 2018/0123871 A1* | 5/2018 | Anami | ................ | G06F 11/2028 |
| 2020/0177671 A1* | 6/2020 | Tofighbakhsh | ......... | H04L 67/12 |
| 2020/0322361 A1* | 10/2020 | Ravindra | ............. | G06F 40/279 |
| 2021/0165790 A1* | 6/2021 | Chitty | ................. | G06F 16/2465 |

OTHER PUBLICATIONS

U.S. Appl. No. 17/747,193 filed in the name of Zijia Wang et al. on May 18, 2022, and entitled "Method, Electronic Device and Computer Program Product for Data Transmission."

* cited by examiner

METHOD, ELECTRONIC DEVICE, AND COMPUTER PROGRAM PRODUCT FOR DATA PROCESSING

RELATED APPLICATION(S)

The present application claims priority to Chinese Patent Application No. 202210658237.3, filed Jun. 10, 2022, and entitled "Method, Electronic Device, and Computer Program Product for Data Processing," which is incorporated by reference herein in its entirety.

FIELD

Embodiments of the present disclosure relate to the field of computers, and more particularly, to a method, an electronic device, and a computer program product for data processing.

BACKGROUND

With the rise of edge computing and 5G technologies, increasingly more devices with powerful computing capabilities can be deployed on edge nodes. For example, a smart camera with an embedded custom function (e.g., an automatic vehicle detection function) may exist in a traffic monitoring scenario. Video data captured by the smart camera may be generally stored on edge nodes temporarily. It is generally laborious and time-consuming to search such unstructured data for specific data. How to search the unstructured data and perform other operations thereon is an urgent problem to be solved at present.

SUMMARY

Embodiments of the present disclosure provide a solution for data processing.

In a first aspect of the present disclosure, a method for data processing is provided. The method may include receiving a data conversion strategy from a server. The method may further include determining, in response to receiving unstructured data from a field device, metadata of the unstructured data based on the received data conversion strategy to form a set of metadata. In addition, the method may include transmitting at least a part of the set of metadata to the server.

In a second aspect of the present disclosure, a method for data processing is provided. The method may include transmitting a data conversion strategy to one or a plurality of edge computing nodes, the data conversion strategy being used for converting unstructured data into metadata. The method may further include receiving, from the one or plurality of edge computing nodes, a set of metadata determined based on the data conversion strategy. In addition, the method may include determining a data processing result at least based on the received set of metadata.

In a third aspect of the present disclosure, an electronic device is provided, including: a processor; and a memory coupled to the processor and having instructions stored therein, wherein the instructions, when executed by the processor, cause the electronic device to perform actions including: receiving a data conversion strategy from a server; determining, in response to receiving unstructured data from a field device, metadata of the unstructured data based on the received data conversion strategy to form a set of metadata; and transmitting at least a part of the set of metadata to the server.

In a fourth aspect of the present disclosure, an electronic device is provided, which includes a processor; and a memory coupled to the processor and having instructions stored therein, wherein the instructions, when executed by the processor, cause the electronic device to perform actions including: transmitting a data conversion strategy to one or a plurality of edge computing nodes, the data conversion strategy being used for converting unstructured data into metadata; receiving, from the one or plurality of edge computing nodes, a set of metadata determined based on the data conversion strategy; and determining a data processing result at least based on the received set of metadata.

In a fifth aspect of the present disclosure, a computer program product is provided. The computer program product is tangibly stored on a non-transitory computer-readable medium and includes machine-executable instructions, wherein the machine-executable instructions, when executed by a machine, cause the machine to perform any steps of the method according to the first aspect or the second aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By describing example embodiments of the present disclosure in more detail with reference to the accompanying drawings, the above and other objectives, features, and advantages of the present disclosure will become more apparent, wherein identical or similar reference numbers generally represent identical or similar components in the example embodiments of the present disclosure. In the drawings.

DETAILED DESCRIPTION

The principles of the present disclosure will be described below with reference to several example embodiments illustrated in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of other embodiments." The terms "first," "second," and the like may refer to different or identical objects. Other explicit and implicit definitions may also be included below.

In addition, the term "unstructured data" mentioned herein is used for representing data or resources with an irregular or incomplete data structure, having no predefined data model, and not easily represented by a two-dimensional logical table of a database, such as images and audio/video information. The term "metadata" mentioned herein is used for representing structured data corresponding to unstructured data. In addition, the term "field device" mentioned herein is used for representing a device that acquires relevant sensing information or monitoring data on the site in real time, such as a roadside device in a vehicle network, which is generally arranged close to an edge computing node but away from a server such as a data center. Embodiments of the present disclosure are described below by taking the roadside device as an example, which is not intended to limit the protection scope of the present disclosure.

As discussed above, at present, for the unstructured data stored at the server or the edge node, directly processing, such as searching, the data can be performed only manually, which is time-consuming and laborious.

For example, as unstructured data, video data for monitoring road condition information acquired by the roadside device cannot be searched according to content. Therefore, in order to search for a vehicle or pedestrian with a certain feature or some features, a large amount of manpower is generally required to search the stored video data manually. It is understandable that this manner of searching is time-consuming and laborious, and has false or missed detection problems caused by human error.

In addition, current roadside devices may generally upload acquired unstructured data to a server such as a data center periodically. Therefore, the server may generally process the unstructured data while maintaining the unstructured data acquired by each roadside device. Since the roadside devices are generally arranged as principle servers, the acquired unstructured data is not processed in a timely manner, and the computing load of the server may increase significantly with an increase in the number of the roadside devices.

In order to solve, at least in part, the above problems, an embodiment of the present disclosure provides a novel solution for data processing. Firstly, a data conversion strategy may be predetermined to convert unstructured data into structured data. For example, one or a plurality of features of a monitored object in each frame of image in a monitoring video may be determined by an image recognition technology, and the features may be recorded as structured data in a form of coding. Secondly, a processing workload of unstructured data received in real time may be transferred to an edge computing node, thereby reducing the workload on a server. Structured data generated at the edge computing node can be transmitted to the server, so as to be combined with structured data on the side of the server. Through the above operations, the unstructured data may be processed into structured data in real time at the edge computing node, so as to meet user requirements such as searching in a timely and effective manner.

Figure 1:
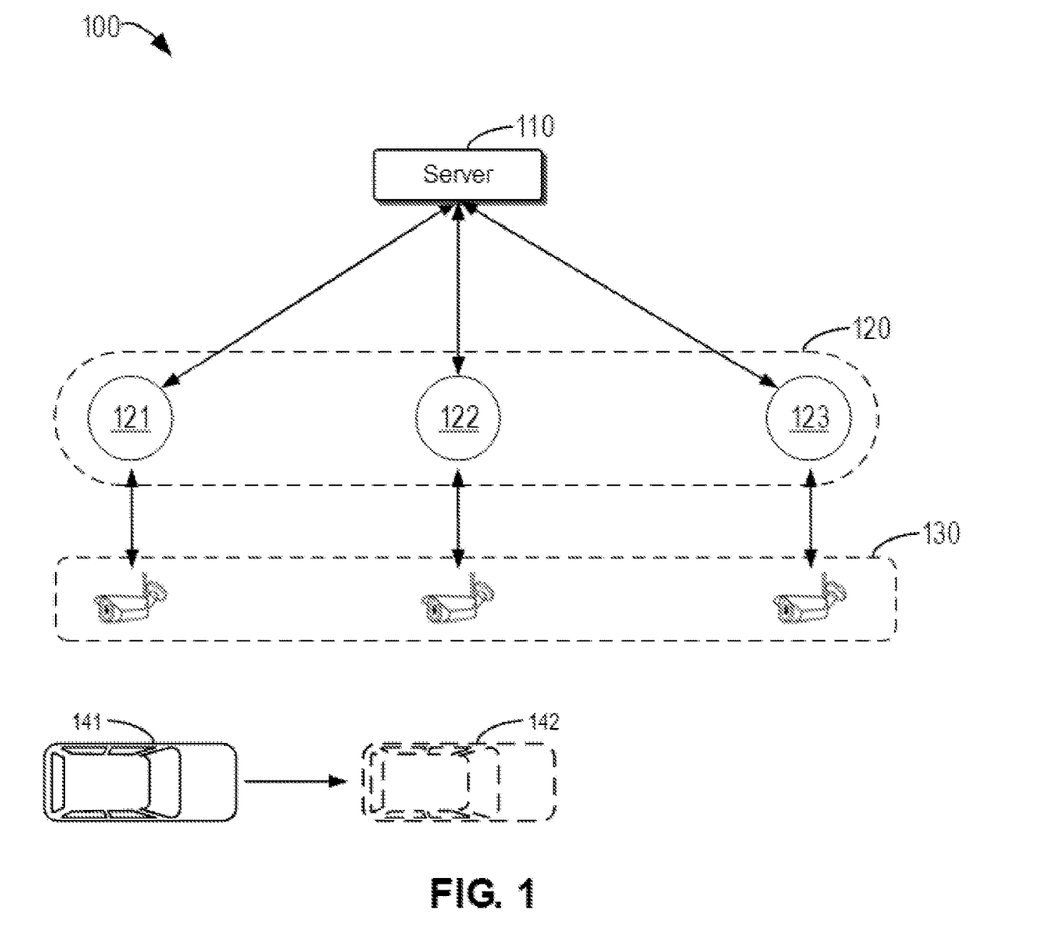
FIG. 1 is a schematic diagram of an example environment according to an embodiment of the present disclosure.

FIG. 1 is a schematic diagram of an example environment according to an embodiment of the present disclosure. In example environment 100, a device and/or a process according to embodiments of the present disclosure may be implemented. As shown in FIG. 1, example environment 100 may include server 110, edge computing nodes 121, 122, and 123 (which may generally be collectively referred to as "edge computing node 120" hereinafter), roadside device 130, and monitored object 141.

In FIG. 1, server 110 is configured to manage edge computing nodes 121, 122, and 123. Specifically, server 110 may send instructions to edge computing nodes 121, 122, and 123 to acquire monitoring data stored at edge computing nodes 121, 122, and 123. In addition, server 110 may send a data conversion strategy to edge computing nodes 121, 122, and 123 to enable edge computing nodes 121, 122, and 123 to have a function of converting unstructured data such as the monitoring data into structured data.

It should be understood that, although FIG. 1 shows a situation where edge computing nodes 121, 122, and 123 serve as nodes of the same level, in fact, various nodes in edge computing nodes 120 may have more hierarchical management relationships. That is, another edge computing node that manages edge computing node 121 or another edge computing node that is managed by edge computing node 121 may exist. In addition, as shown in FIG. 1, edge computing node 120 may communicate with one or a plurality of roadside devices 130, so as to acquire on-site road condition information. It should be understood that the establishment of the edge computing nodes can provide the roadside devices on the site with edge computing nodes within a short distance, thereby reducing the latency of a communication link.

In addition, in FIG. 1, monitored object 141 may be a vehicle. In a monitored road surface environment in FIG. 1, monitored object 141 travels in the arrow direction and may appear at position 142 as expected. Therefore, a plurality of roadside devices 130 may all acquire a monitoring video of monitored object 141.

In some embodiments, server 110 may be any device with a computing capability. As a non-limiting example, server 110 may be any type of fixed computing device or mobile computing device, including but not limited to a desktop computer, a laptop computer, a notebook computer, a tablet computer, and the like. All or part of the components of server 110 may be distributed in a cloud. Server 110 and the edge computing nodes connected thereto may also adopt a cloud-edge architecture.

In some embodiments, edge computing node 120 may include a memory at least used for storing processed structured data. These memories may be replaced by various other types of devices with a storage function, including but not limited to a hard disk drive (HDD), a solid state drive (SSD), a removable disk, any other magnetic storage device and any other optical storage device, or any combination thereof In some embodiments, monitored object 141 may also be a pedestrian, video data uploaded by a network user, or the like.

Figure 2:
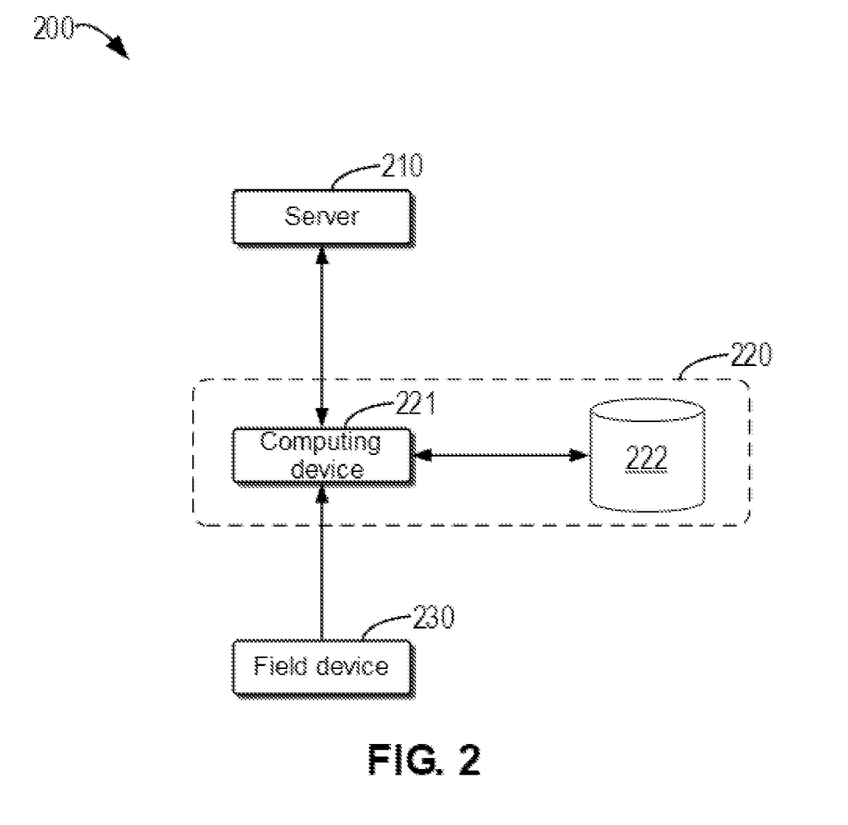
FIG. 2 is a schematic diagram of interaction of an edge computing node with a server and a field device according to an embodiment of the present disclosure.

A specific arrangement of edge computing node 220, server 210, and field device 230 will be described in detail below with reference to FIG. 2. FIG. 2 is a schematic diagram 200 of interaction of edge computing node 220 with server 210 and field device 230 according to an embodiment of the present disclosure. As shown in FIG. 2, server 210 may be configured to deliver a predetermined data conversion strategy to edge computing node 220. Computing device 221 included in edge computing node 220 may process unstructured data from the field device 230 in real time based on the received data conversion strategy, and store structured data after conversion into memory 222 included in edge computing node 220. It should be understood that computing device 221 may periodically instruct memory 222 to upload the structured data stored therein. Alternatively or additionally, computing device 221 may also instruct, based on a data pull instruction of server 210, memory 222 to upload the structured data stored therein. In this way, the unstructured data can be converted into structured data at the edge computing node, so that a user can retrieve the structured data, and the computing workload on the side of the server can also be reduced.

It should be understood that, although server 210 shown in FIG. 2 is configured to deliver the predetermined data conversion strategy to edge computing node 220 and then data is processed at edge computing node 220, in fact, static data stored in server 210 may also be processed at server 210 based on the predetermined data conversion strategy. In addition, although only a communication connection between server 210 and one edge computing node 220 is shown, communication connections between server 210 and other edge computing nodes may also be included. Accordingly, FIG. 2 is intended only to illustrate some concepts of the present disclosure and is not intended to limit the scope of the present disclosure.

A process for data processing according to embodiments of the present disclosure will be described in detail below with reference to FIG. 3 and FIG. 4. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 3:
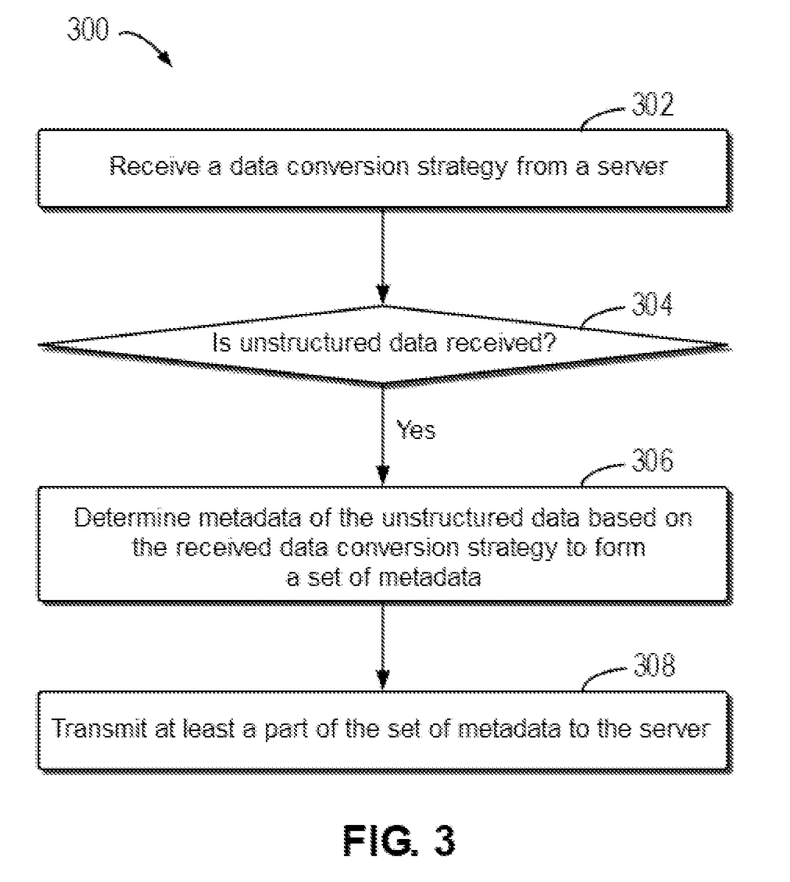
FIG. 3 is a flow chart of a process for data processing according to an embodiment of the present disclosure.

FIG. 3 is a flow chart of process 300 for data processing according to an embodiment of the present disclosure. In some embodiments, process 300 may be implemented in computing device 221 in FIG. 2. Process 300 for data processing according to an embodiment of the present disclosure is now described with reference to FIG. 3. For ease of understanding, specific examples mentioned in the following description are all illustrative and are not intended to limit the protection scope of the present disclosure.

As shown in FIG. 3, in 302, computing device 221 may receive a data conversion strategy from server 210. It should be understood that the data conversion strategy may be a data processing rule predetermined by an operator. As an example, the data conversion strategy may be determined based on the following JSON format.

```
{
    Updated: xxx,
    Source: {
        Filename: xxx,
        Data location: xxx,
    },
    Rules: [
        {
            Rule: license plate,
            Properties: [
                {
                    Timestamp: xxx,
                    License plate number: A-aaaaa,
                    Location: {xxx, xxx},
                },
                {
                    Timestamp: xxx,
                    License plate number: A-xxxxx,
                    Location: {xxx, xxx},
                },
            ],
        },
        {
            Rule: human appearance,
            Properties: [
                {
                    Gender: xxx,
                    Timestamp: xxx,
                    Characteristic: { },
                }
            ]
        },
        ...
    ],
}
```

As described above, from unstructured data such as a video or an image, a file name of the video or image, a location from which data is acquired, and information such as when a license plate appears at a position, as well as information such as the gender of a pedestrian and the time when the pedestrian is being monitored, may be determined based on the data conversion strategy. It should be understood that computing device 221 may acquire information of a monitored object in the video based on an image recognition technology and convert, in a specific format such as JSON, the video information into structured data that is easy to retrieve.

In 304, computing device 221 may detect whether unstructured data from field device 230 is received. If computing device 221 receives the unstructured data from field device 230, the process proceeds to 306.

In 306, computing device 221 may determine metadata of the unstructured data based on the received data conversion strategy to form a set of metadata. It should be understood that the metadata is structured data, which may be generated based on the JSON format above.

In some embodiments, field device 230 may be a roadside monitoring device, and the unstructured data is a roadside monitoring video. In order to determine the metadata of the unstructured data as the roadside monitoring video, field device 230 may identify one or a plurality of features of a monitored object from at least one monitoring image of the roadside monitoring video and determine the one or plurality of features as the metadata. As an example, when the at least one monitoring image includes a front image of a vehicle, computing device 221 may use an image recognition model to determine a license plate number of the vehicle in the monitoring image. In this way, the time when the vehicle using the license plate number passes through the location of the roadside device that acquires the monitoring image may be determined. As another example, when the at least one monitoring image includes an image of a pedestrian, computing device 221 may use the image recognition model to determine the gender, hair color, height, and other features of the pedestrian. In this way, the time when the pedestrian with the features passes through the location of the roadside device that acquires the monitoring image may be determined.

In 308, computing device 221 may transmit at least a part of the set of metadata to server 210. In some embodiments, computing device 221 may store the processed set of metadata into memory 222 included in edge computing node 220. The metadata stored in memory 222 may be periodically uploaded to server 210. Alternatively or additionally, the metadata stored in memory 222 may be uploaded to server 210 based on an instruction of server 210. In addition, server 210 may specify a time period of the metadata in the instruction, so that metadata corresponding to unstructured data acquired during a certain period of time can be uploaded.

In some embodiments, the at least a part of metadata transmitted to server 210 is combined with metadata determined at server 210 or metadata from another edge node received by server 210 as a data processing result. It should be understood that, in a vehicle monitoring scenario, the data processing result may correspond to a historical track of the vehicle with the license plate.

In some embodiments, process 300 may further include: determining, by computing device 221 when receiving a search request from server 210, target metadata matching keyword information included in the search request from the set of metadata, generating a search response corresponding to the search request based on the target metadata, and transmitting the search response to server 210. As an example, a user may send a search request for searching for a license plate to server 210. The search request may include a search keyword, such as license plate number A-aaaaa. Server 210 may deliver the search request to a plurality of edge computing nodes including edge computing node 220, and computing device 221 may search memory 222 based on license plate number A-aaaaa, so as to find target metadata matching the license plate number and then find a historical track of the license plate number. It should be understood that server 210 may also search the data processing result after the combination for the target metadata matching the license plate number.

It should be understood that, in the above embodiment, edge computing is performed on unstructured data by receiving a data conversion strategy on the side of computing device 221, converting the unstructured data received in real time into structured data, and transmitting the structured data back to server 210, which not only enables timely processing of monitoring data, but also reduces computing load on the side of the server, thereby improving the user experience.

Figure 4:
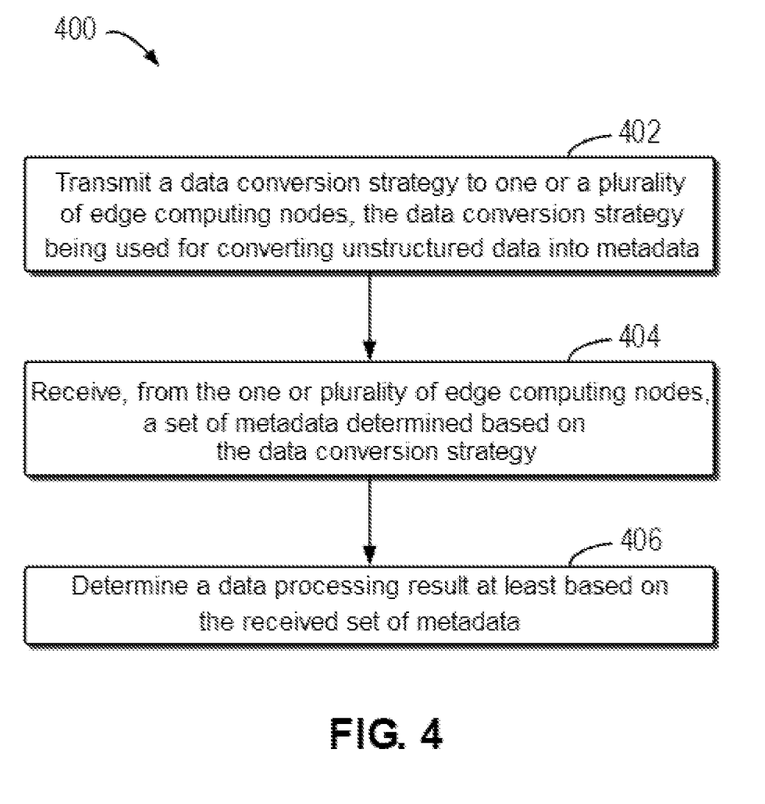
FIG. 4 is a flow chart of a process for data processing according to an embodiment of the present disclosure.

FIG. 4 is a flow chart of process 400 for data processing according to an embodiment of the present disclosure. In some embodiments, process 400 may be implemented in server 210 in FIG. 2. Process 400 for data processing according to an embodiment of the present disclosure is now described with reference to FIG. 4. For ease of understanding, specific examples mentioned in the following description are all illustrative and are not intended to limit the protection scope of the present disclosure.

As shown in FIG. 4, in 402, server 210 may transmit a data conversion strategy to one or a plurality of edge computing nodes, the data conversion strategy being used for converting unstructured data into metadata. It should be understood that the data conversion strategy is identical with or similar to the data conversion strategy discussed in FIG. 3, and is therefore not further described here.

In 404, server 210 may receive, from the one or plurality of edge computing nodes, a set of metadata determined based on the data conversion strategy. It should be understood that the metadata is structured data, which may be generated based on the JSON format above.

In 406, server 210 may determine a data processing result at least based on the received set of metadata. In addition, in some embodiments, server 210 may also determine metadata of local static data based on the data conversion strategy. As an example, server 210 may continuously perform the operation of determining metadata of local static data based on the data conversion strategy when delivering the data conversion strategy to the edge computing node.

In some embodiments, in order to determine the above data processing result, server 210 may combine the set of metadata with the determined metadata of the local static data as the data processing result. In other words, server 210 may aggregate metadata processed by the server as well as the metadata uploaded by another edge computing node. The aggregated metadata may provide support for a comprehensive search function.

In some embodiments, the unstructured data may be a roadside monitoring video. In order to determine the metadata of the local static data, server 210 may identify one or a plurality of features of the monitored object from at least one monitoring image of the roadside monitoring video and determine the one or plurality of features as the metadata of the local static data. The metadata of the local static data may be structured data. As an example, when the at least one monitoring image includes a front image of a vehicle, server 210 may use an image recognition model to determine a license plate number of the vehicle in the monitoring image. In this way, the time when the vehicle using the license plate number passes through the location of the roadside device that acquires the monitoring image may be determined. As another example, when the at least one monitoring image includes an image of a pedestrian, server 210 may use the image recognition model to determine the gender, hair color, height, and other features of the pedestrian. In this way, the time when the pedestrian with the features passes through the location of the roadside device that acquires the monitoring image may be determined.

In some embodiments, process 400 may further include: determining, by server 210 when receiving a search request, target metadata matching keyword information included in the search request from the data processing result, and generating a search response corresponding to the search request based on the target metadata. Then, server 210 may determine a movement track of the monitored object based on the data processing result. As an example, a user may send a search request for searching for a license plate to server 210. The search request may include a search keyword, such as license plate number A-aaaaa Server 210 may conduct a search based on license plate number A-aaaaa, so as to find target metadata matching the license plate number and then find a historical track of the license plate number.

It should be understood that, in the above embodiment, edge processing is performed on unstructured data by generating and delivering a data conversion strategy on the side of server 210 and aggregating the edge computing nodes, which not only enables timely processing of monitoring data, but also reduces computing load on the side of the server, thereby improving the user experience.

Figure 5:
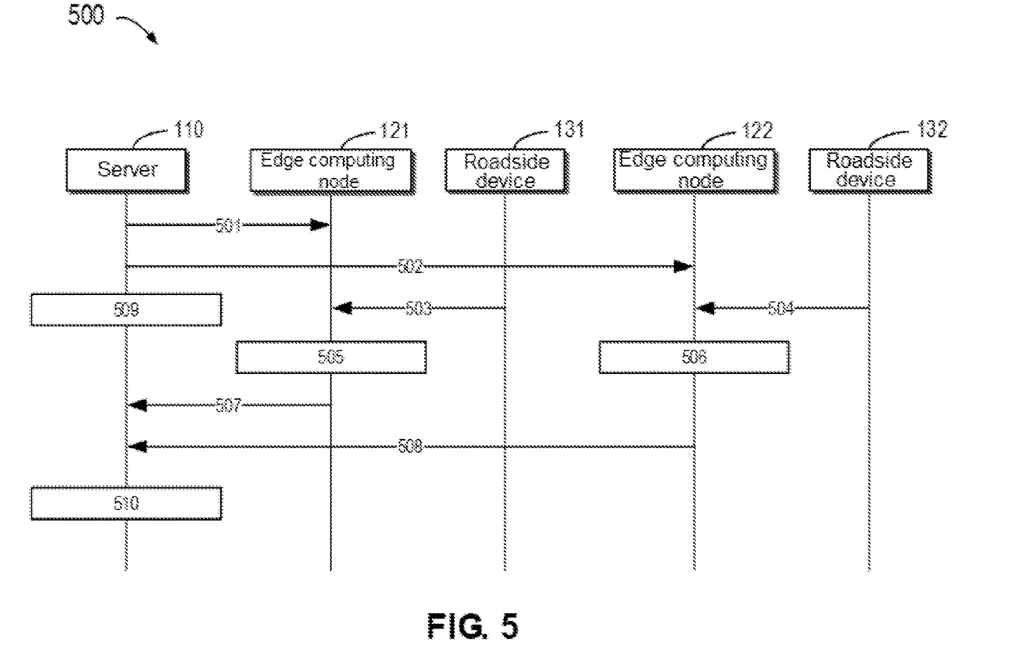
FIG. 5 is a high-level pipeline diagram of a process for data processing according to an embodiment of the present disclosure.

In order to illustrate an embodiment of the present disclosure more clearly, FIG. 5 is a high-level pipeline diagram of process 500 for data processing according to an embodiment of the present disclosure.

As shown in FIG. 5, process 500 for data processing mainly involves multi-party information interaction between server 110, edge computing node 121, edge computing node 122, roadside device 131, and roadside device 132. It should be understood that FIG. 5 is only an example, and more edge computing nodes and roadside devices may be included.

In FIG. 5, process 500 for data processing generally starts from server 110. A data conversion strategy determined by a user may generally be generated on the side of server 110, and the data conversion strategy is sent (501) to edge computing node 121 and sent (502) to edge computing node 122. Roadside device 131 may be configured to transmit (503) unstructured data such as a monitoring video to edge computing node 121 in real time, and roadside device 132 may be configured to transmit (504) unstructured data such as a monitoring video to edge computing node 122 in real time. It should be understood that the two transmission (503, 504) processes may be performed at different times.

Then, edge computing node 121 performs data processing (505) on the unstructured data from roadside device 131 based on the received data conversion strategy to convert the unstructured data into structured data or metadata. In addition, edge computing node 122 performs data processing (506) on the unstructured data from roadside device 132 based on the received data conversion strategy to convert the unstructured data into structured data or metadata. It should be understood that the data processing (505, 506) processes may be performed at different times. Further, edge computing node 121 transmits (507) the structured data after conversion to server 110, and edge computing node 122 transmits (508) the structured data after conversion to server 110.

It should be understood that, after server 110 generates the data conversion strategy, server 110 may perform data processing (509) on static data stored locally in any time period, that is, convert historical data stored at server 110 as unstructured data into structured data. Moreover, server 110 may combine (510) local structured data with structured data from edge computing node 121 and structured data from edge computing node 122 to generate a data processing result.

In this way, server 110 may use a plurality of edge computing nodes to comprehensively acquire structured data of all monitored objects in a monitoring region, which is conducive to searching, monitoring, movement track generation, and other operations.

Figure 6:
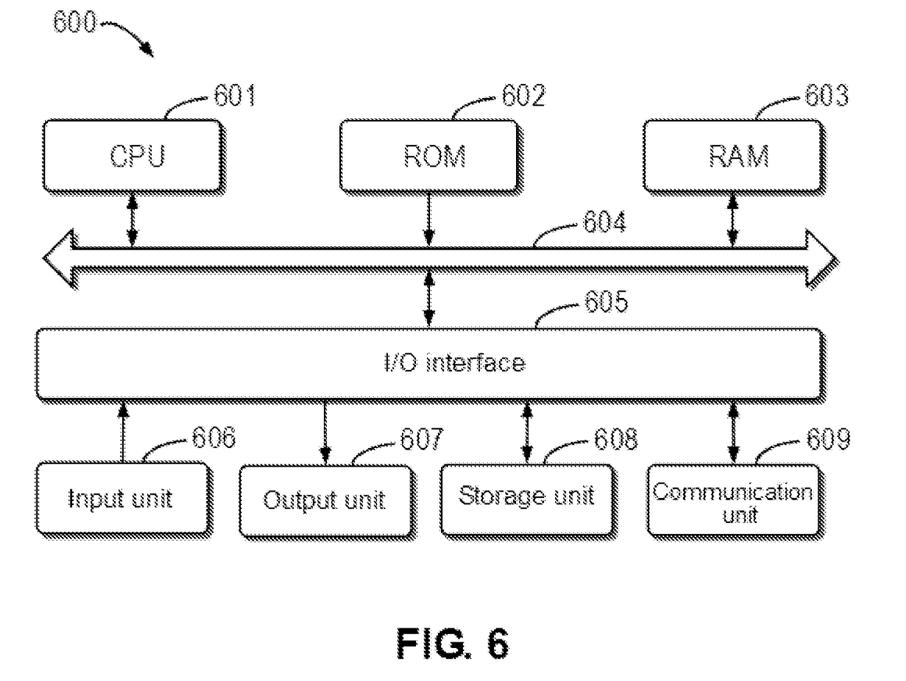
FIG. 6 is a block diagram of an example device that may be configured to implement an embodiment of the present disclosure.

FIG. 6 is a block diagram of example electronic device 600 that may be configured to implement an embodiment of the present disclosure. For example, device 600 may be configured to implement computing device 221 as shown in FIG. 2. As shown in the drawing, device 600 includes a central processing unit (CPU) 601 that may perform various appropriate actions and processing according to computer program instructions stored in read-only memory (ROM) 602 or computer program instructions loaded from storage unit 608 into random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 performs the various methods and processing described above, such as processes 300 and 400. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or a plurality of steps of any process described above may be implemented. Alternatively, in other embodiments, CPU 601 may be configured in any other suitable manners (for example, by means of firmware) to perform a process such as processes 300 and 400.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of those described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of some embodiments of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible embodiments of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative embodiments, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The foregoing description is illustrative rather than exhaustive, and is not limited to the disclosed embodiments. Numerous modifications and alterations will be apparent to persons of ordinary skill in the art without departing from the scope and spirit of the illustrated embodiments. The selection of terms used herein is intended to best explain the principles and practical applications of the embodiments or the improvements to technologies on the market, so as to enable persons of ordinary skill in the art to understand the embodiments disclosed herein.

What is claimed is:

1. A method for data processing, comprising:
   receiving, in a first edge computing node over a network, a data conversion strategy from a server, the data conversion strategy including rules for performing particular data processing operations in the first edge computing node as directed by the server, the rules for performing particular data processing operations including at least one rule for identifying a plurality of objects of respective different specified object types, the server being implemented in a cloud that is separate from a plurality of edge computing nodes including the first edge computing node in accordance with a cloud-edge architecture;
   implementing a processor-based image recognition model in the first edge computing node;
   determining in the first edge computing node, utilizing the processor-based image recognition model and in response to receiving unstructured data from a field device coupled to the first edge computing node via the network, metadata of the unstructured data based on the received data conversion strategy to form a set of metadata, wherein the unstructured data comprises at least one image and the metadata comprises at least one result of applying the at least one image to the processor-based image recognition model; and transmitting over the network at least a part of the set of metadata from the first edge computing node to the server as first transmitted metadata;

wherein the first transmitted metadata from the first edge computing node is processed in the server, in combination with second transmitted metadata received in the server over the network from a second edge computing node, different than the first edge computing node, the first and second edge computing nodes being in communication over the network with respective different field devices at respective different first and second geographic locations, to track a particular object, characterized at least in part by the first transmitted metadata and the second transmitted metadata, from the first location to the second location;

wherein the data conversion strategy received in the first edge computing node over the network comprises one or more instructions from the server for converting at least a portion of the unstructured data received in the first edge computing node from the field device into corresponding structured data in the first edge computing node, the set of metadata comprising the corresponding structured data, the one or more instructions of the data conversion strategy comprising one or more data processing rules for extracting particular specified information from the unstructured data in the first edge computing node in accordance with a structured data format, the particular specified information including at least (i) a particular data item of a particular data type to be extracted, (ii) a specified location for which the particular data item of the particular data type is to be extracted, and (iii) an associated time indicator to be extracted for the particular data item of the particular data type, the associated time indicator indicating a time at which the particular data item of the particular data type appeared at the specified location in the unstructured data;

wherein the second edge computing node receives a corresponding instance of the data conversion strategy over the network from the server and generates the second transmitted metadata based on that corresponding instance; and wherein at least one of the first and second transmitted metadata sent from the respective first and second edge computing nodes to the server over the network is further processed in the server utilizing additional metadata accessible in the server to generate a data processing result for at least the unstructured data received in the first edge computing node from the field device.

2. The method according to claim 1, further comprising:
determining, in response to receiving a search request from the server, target metadata matching keyword information comprised in the search request from the set of metadata;
generating a search response corresponding to the search request based on the target metadata; and
transmitting the search response to the server.

3. The method according to claim 1, wherein the at least a part of metadata transmitted to the server is combined with metadata determined at the server or metadata from another edge computing node received by the server as the data processing result.

4. The method according to claim 1, wherein the field device is a roadside monitoring device, and the unstructured data is a roadside monitoring video, and wherein determining metadata of the unstructured data comprises:
identifying one or a plurality of features of a monitored object from at least one monitoring image of the roadside monitoring video; and
determining the one or plurality of features as the metadata, the metadata being structured data.

5. A method for data processing, comprising:
transmitting a data conversion strategy over a network from a server to one or a plurality of edge computing nodes, the data conversion strategy including rules for performing particular data processing operations in the one or plurality of edge computing nodes as directed by the server, the rules for performing particular data processing operations including at least one rule for identifying a plurality of objects of respective different specified object types, the data conversion strategy being used for converting unstructured data into metadata in the one or plurality of edge computing nodes, the server being implemented in a cloud that is separate from the one or plurality of edge computing nodes in accordance with a cloud-edge architecture;
receiving, in the server over the network from the one or plurality of edge computing nodes, a set of metadata determined based on the data conversion strategy; and
determining in the server a data processing result at least based on the received set of metadata;
wherein first transmitted metadata received in the server over the network from a first one of the edge computing nodes is processed in the server, in combination with second transmitted metadata received in the server over the network from a second one of the edge computing nodes, different than the first edge computing node, the first and second edge computing nodes being in communication over the network with respective different field devices at respective different first and second geographic locations, to track a particular object, characterized at least in part by the first transmitted metadata and the second transmitted metadata, from the first location to the second location, at least the first edge computing node implementing a processor-based image recognition model, the unstructured data comprising at least one image and the first transmitted metadata comprising at least one result of applying the at least one image to the processor-based image recognition model in the first edge computing node;
wherein the data conversion strategy received over the network by the one or plurality of edge computing nodes comprises one or more instructions from the server for converting at least a portion of unstructured data received in the one or plurality of edge computing nodes from at least one field device into corresponding structured data in the one or plurality of edge computing nodes, the set of metadata comprising the corresponding structured data, the one or more instructions of the data conversion strategy comprising one or more data processing rules for extracting particular specified information from the unstructured data in the first edge computing node in accordance with a structured data format, the particular specified information including at least (i) a particular data item of a particular data type to be extracted, (ii) a specified location for which the particular data item of the particular data type is to be extracted, and (iii) an associated time indicator to be extracted for the particular data item of the particular data type, the associated time indicator indicating a time at which the particular data item of the particular data type appeared at the specified location in the unstructured data; and wherein at least one of the first and second transmitted metadata received in the server over the network from the respective first and second edge computing nodes is further processed in the server utilizing additional metadata accessible in the server to generate the data processing result.

6. The method according to claim 5, further comprising:
determining metadata of local static data based on the data conversion strategy,
wherein determining the data processing result comprises:
combining the set with the determined metadata of the local static data as the data processing result.

7. The method according to claim 5, further comprising:
determining, in response to receiving a search request, target metadata matching keyword information comprised in the search request from the data processing result; and
generating a search response corresponding to the search request based on the target metadata.

8. The method according to claim 6, wherein the unstructured data is a roadside monitoring video, and wherein determining metadata of the local static data comprises:
identifying one or a plurality of features of a monitored object from at least one monitoring image of the roadside monitoring video; and
determining the one or plurality of features as the metadata of the local static data, the metadata of the local static data being structured data.

9. The method according to claim 8, further comprising:
determining a movement track of the monitored object based on the data processing result.

10. An apparatus comprising:
an electronic device, wherein the electronic device comprises:
a processor; and
a memory, coupled to the processor and having instructions stored therein, wherein the instructions, when executed by the processor, cause the electronic device to perform actions comprising:
receiving, in a first edge computing node over a network, a data conversion strategy from a server, the data conversion strategy including rules for performing particular data processing operations in the first edge computing node as directed by the server, the rules for performing particular data processing operations including at least one rule for identifying a plurality of objects of respective different specified object types, the server being implemented in a cloud that is separate from a plurality of edge computing nodes including the first edge computing node in accordance with a cloud-edge architecture;
implementing a processor-based image recognition model in the first edge computing node;
determining in the first edge computing node, utilizing the processor-based image recognition model and in response to receiving unstructured data from a field device coupled to the first edge computing node via the network, metadata of the unstructured data based on the received data conversion strategy to form a set of metadata, wherein the unstructured data comprises at least one image and the metadata comprises at least one result of applying the at least one image to the processor-based image recognition model; and transmitting over the network at least a part of the set of metadata from the first edge computing node to the server as first transmitted metadata;

wherein the first transmitted metadata from the first edge computing node is processed in the server, in combination with second transmitted metadata received in the server over the network from a second edge computing node, different than the first edge computing node, the first and second edge computing nodes being in communication over the network with respective different field devices at respective different first and second geographic locations, to track a particular object, characterized at least in part by the first transmitted metadata and the second transmitted metadata, from the first location to the second location;

wherein the data conversion strategy received in the first edge computing node over the network comprises one or more instructions from the server for converting at least a portion of the unstructured data received in the first edge computing node from the field device into corresponding structured data in the first edge computing node, the set of metadata comprising the corresponding structured data, the one or more instructions of the data conversion strategy comprising one or more data processing rules for extracting particular specified information from the unstructured data in the first edge computing node in accordance with a structured data format, the particular specified information including at least (i) a particular data item of a particular data type to be extracted, (ii) a specified location for which the particular data item of the particular data type is to be extracted, and (iii) an associated time indicator to be extracted for the particular data item of the particular data type, the associated time indicator indicating a time at which the particular data item of the particular data type appeared at the specified location in the unstructured data;

wherein the second edge computing node receives a corresponding instance of the data conversion strategy over the network from the server and generates the second transmitted metadata based on that corresponding instance; and wherein at least one of the first and second transmitted metadata sent from the respective first and second edge computing nodes to the server over the network is further processed in the server utilizing additional metadata accessible in the server to generate a data processing result for at least the unstructured data received in the first edge computing node from the field device.

11. The apparatus according to claim 10, wherein the actions further comprise:
determining, in response to receiving a search request from the server, target metadata matching keyword information comprised in the search request from the set of metadata;
generating a search response corresponding to the search request based on the target metadata; and
transmitting the search response to the server.

12. The apparatus according to claim 10, wherein the at least a part of metadata transmitted to the server is combined with metadata determined at the server or metadata from another edge computing node received by the server as the data processing result.

13. The apparatus according to claim 10, wherein the field device is a roadside monitoring device, and the unstructured data is a roadside monitoring video, and wherein determining metadata of the unstructured data comprises:
  identifying one or a plurality of features of a monitored object from at least one monitoring image of the roadside monitoring video; and
  determining the one or plurality of features as the metadata, the metadata being structured data.

14. The apparatus according to claim 10, further comprising:
  an additional electronic device, comprising:
  a processor; and
  a memory, coupled to the processor and having instructions stored therein, wherein the instructions, when executed by the processor, cause the additional electronic device to perform actions comprising:
  transmitting the data conversion strategy from the server to one or a plurality of edge computing nodes including at least the first edge computing node;
  receiving, from the one or plurality of edge computing nodes, the set of metadata determined based on the data conversion strategy; and
  determining the data processing result at least based on the received set of metadata.

15. The apparatus according to claim 14, wherein the actions performed by the additional electronic device further comprise:
  determining metadata of local static data based on the data conversion strategy,
  wherein determining the data processing result comprises:
  combining the set with the determined metadata of the local static data as the data processing result.

16. The apparatus according to claim 14, wherein the actions performed by the additional electronic device further comprise:
  determining, in response to receiving a search request, target metadata matching keyword information comprised in the search request from the data processing result; and
  generating a search response corresponding to the search request based on the target metadata.

17. The apparatus according to claim 15, wherein the unstructured data is a roadside monitoring video, and wherein determining metadata of the local static data comprises:
  identifying one or a plurality of features of a monitored object from at least one monitoring image of the roadside monitoring video; and
  determining the one or plurality of features as the metadata of the local static data, the metadata of the local static data being structured data.

18. The apparatus according to claim 17, wherein the actions performed by the additional electronic device further comprise:
  determining a movement track of the monitored object based on the data processing result.

19. A computer program product tangibly stored on a non-transitory computer-readable medium and comprising machine-executable instructions, wherein the machine-executable instructions, when executed by a machine, cause the machine to perform a method for data processing, comprising:
  receiving, in a first edge computing node over a network, a data conversion strategy from a server, the data conversion strategy including rules for performing particular data processing operations in the first edge computing node as directed by the server, the rules for performing particular data processing operations including at least one rule for identifying a plurality of objects of respective different specified object types, the server being implemented in a cloud that is separate from a plurality of edge computing nodes including the first edge computing node in accordance with a cloud-edge architecture;
  implementing a processor-based image recognition model in the first edge computing node;
  determining in the first edge computing node, utilizing the processor-based image recognition model and in response to receiving unstructured data from a field device coupled to the first edge computing node via the network, metadata of the unstructured data based on the received data conversion strategy to form a set of metadata, wherein the unstructured data comprises at least one image and the metadata comprises at least one result of applying the at least one image to the processor-based image recognition model; and
  transmitting over the network at least a part of the set of metadata from the first edge computing node to the server as first transmitted metadata;
  wherein the first transmitted metadata from the first edge computing node is processed in the server, in combination with second transmitted metadata received in the server over the network from a second edge computing node, different than the first edge computing node, the first and second edge computing nodes being in communication over the network with respective different field devices at respective different first and second geographic locations, to track a particular object, characterized at least in part by the first transmitted metadata and the second transmitted metadata, from the first location to the second location;
  wherein the data conversion strategy received in the first edge computing node over the network comprises one or more instructions from the server for converting at least a portion of the unstructured data received in the first edge computing node from the field device into corresponding structured data in the first edge computing node, the set of metadata comprising the corresponding structured data, the one or more instructions of the data conversion strategy comprising one or more data processing rules for extracting particular specified information from the unstructured data in the first edge computing node in accordance with a structured data format, the particular specified information including at least (i) a particular data item of a particular data type to be extracted, (ii) a specified location for which the particular data item of the particular data type is to be extracted, and (iii) an associated time indicator to be extracted for the particular data item of the particular data type, the associated time indicator indicating a time at which the particular data item of the particular data type appeared at the specified location in the unstructured data;
  wherein the second edge computing node receives a corresponding instance of the data conversion strategy over the network from the server and generates the second transmitted metadata based on that corresponding instance; and
  wherein at least one of the first and second transmitted metadata sent from the respective first and second edge computing nodes to the server over the network is further processed in the server utilizing additional metadata accessible in the server to generate a data processing result for at least the unstructured data received in the first edge computing node from the field device.

20. A computer program product tangibly stored on a non-transitory computer-readable medium and comprising machine-executable instructions, wherein the machine-executable instructions, when executed by a machine, cause the machine to perform a method for data processing, comprising:

transmitting a data conversion strategy over a network from a server to one or a plurality of edge computing nodes, the data conversion strategy including rules for performing particular data processing operations in the one or plurality of edge computing nodes as directed by the server, the rules for performing particular data processing operations including at least one rule for identifying a plurality of objects of respective different specified object types, the data conversion strategy being used for converting unstructured data into metadata in the one or plurality of edge computing nodes, the server being implemented in a cloud that is separate from the one or plurality of edge computing nodes in accordance with a cloud-edge architecture;

receiving, in the server over the network from the one or plurality of edge computing nodes, a set of metadata determined based on the data conversion strategy; and determining in the server a data processing result at least based on the received set of metadata;

wherein first transmitted metadata received in the server over the network from a first one of the edge computing nodes is processed in the server, in combination with second transmitted metadata received in the server over the network from a second one of the edge computing nodes, different than the first edge computing node, the first and second edge computing nodes being in communication over the network with respective different field devices at respective different first and second geographic locations, to track a particular object, characterized at least in part by the first transmitted metadata and the second transmitted metadata, from the first location to the second location, at least the first edge computing node implementing a processor-based image recognition model, the unstructured data comprising at least one image and the first transmitted metadata comprising at least one result of applying the at least one image to the processor-based image recognition model in the first edge computing node;

wherein the data conversion strategy received over the network by the one or plurality of edge computing nodes comprises one or more instructions from the server for converting at least a portion of unstructured data received in the one or plurality of edge computing nodes from at least one field device into corresponding structured data in the one or plurality of edge computing nodes, the set of metadata comprising the corresponding structured data, the one or more instructions of the data conversion strategy comprising one or more data processing rules for extracting particular specified information from the unstructured data in the first edge computing node in accordance with a structured data format, the particular specified information including at least (i) a particular data item of a particular data type to be extracted, (ii) a specified location for which the particular data item of the particular data type is to be extracted, and (iii) an associated time indicator to be extracted for the particular data item of the particular data type, the associated time indicator indicating a time at which the particular data item of the particular data type appeared at the specified location in the unstructured data; and wherein at least one of the first and second transmitted metadata received in the server over the network from the respective first and second edge computing nodes is further processed in the server utilizing additional metadata accessible in the server to generate the data processing result.

* * * * *